US006728311B1

(12) United States Patent
Waschura et al.

(10) Patent No.: US 6,728,311 B1
(45) Date of Patent: Apr. 27, 2004

(54) APPARATUS AND METHOD FOR CREATING EYE DIAGRAM

(76) Inventors: Thomas Eugene Waschura, 3475-D Edison Way, Menlo Park, CA (US) 94025; James Roger Waschura, 3475-D Edison Way, Menlo Park, CA (US) 94025; Robert Lee Verity, 3475-D Edison Way, Menlo Park, CA (US) 94025

( * ) Notice: Subject to any disclaimer, the term of this patent is extended or adjusted under 35 U.S.C. 154(b) by 0 days.

(21) Appl. No.: 09/541,970

(22) Filed: Apr. 4, 2000

(51) Int. Cl.[7] .......................... H04B 17/00; H04B 3/46
(52) U.S. Cl. ....................................... 375/224; 375/228
(58) Field of Search .............................. 375/224, 228, 375/377; 455/67.1, 67.3, 226.1, 226.4; 345/440, 440.1, 441; 324/76.11, 76.12, 76.13, 76.15, 76.16, 612, 613, 614, 620; 714/709, 799, 817, 819; 702/189, 190, 191, 193

(56) References Cited

U.S. PATENT DOCUMENTS

| | | | | |
|---|---|---|---|---|
| 3,721,959 A | * | 3/1973 | George ........................ 714/704 |
| 4,475,210 A | * | 10/1984 | Couch ........................ 375/224 |
| 5,333,147 A | * | 7/1994 | Nohara et al. ............... 375/224 |
| 5,343,405 A | * | 8/1994 | Kucera et al. ................ 702/73 |
| 6,433,899 B1 | * | 8/2002 | Anslow et al. ................ 398/5 |

* cited by examiner

Primary Examiner—Betsy L. Deppe
(74) Attorney, Agent, or Firm—Peninsula IP Group; Douglas A. Chaikin

(57) ABSTRACT

Disclosed herein is an apparatus and a method for determining characteristics of a bit stream of binary pulses having measuring apparatus for sampling pulse voltage levels in excess of voltage threshold levels during each of delayed clock pulses for a series of pulses of the binary coded pulse bit stream. Control apparatus coupled to the measuring apparatus generates a series of the threshold voltage levels and the delayed clock pulses during each period of a bit stream pulse. Multiple counts of the sampled pulse voltage levels are recorded during each delayed clock pulse and accumulated for a series of pulses of the binary coded pulse bit stream. The control apparatus analyzes and processes the accumulated counts to generate an eye diagram therefrom defining the characteristics of the binary pulse bit stream.

23 Claims, 6 Drawing Sheets

FIG.−1

APPARATUS AND METHOD FOR CREATING EYE DIAGRAM

FIELD OF THE INVENTION

This invention relates to apparatus and a method for analyzing a waveform and in particular to apparatus and method for the statistical eye diagram measurement of a high speed binary pulse coded bit stream.

BACKGROUND OF THE INVENTION

High-speed communication systems typically communicate with each other by sending serial bit streams of data between transmitters and receivers. These bit streams are usually binary coded pulse signals represented by zeros and ones which may be electrical voltages or optical signals derived from the electrical voltages created by the transmitters and which pulse coded signals are applied to a transmission facility connecting the transmitters with the receivers. The receivers decode the received pulse code signal data to obtain the information therein.

If a receiver receives pulse code signals that have been deformed by errors occurring in the transmission facility problems or if the receiver improperly decodes the received pulse coded signals, the effect is that bit errors may occur in the communications there resulting in wrong information being received by the receiver. Thus, designers, engineers, installers and maintenance personal need to evaluate the stream of pulse coded signals, oftentimes called bit streams, to monitor system performance and to help in diagnosing system problems. It is typical to monitor the quality of such bit streams by using a sampling oscilloscope.

In the monitoring operation, the bit stream and a trigger input in the form of a clock signal having a repetition rate identical to the repetition rate of the bit stream and synchronous therewith are applied to the inputs of the sampling oscilloscope. Samples of the voltage levels of the binary pulses of the bit stream are taken at various time offsets from the repetitive trigger input and are plotted as sample points on the display of the oscilloscope. Voltage samples are continuously taken of the bit stream and added to the sample oscilloscope in combination with the older sample points, which continue to exist on the sample oscilloscope display. Over a relatively short period of time, hundreds or thousands of the sample points on the sample oscilloscope display plot the possible voltage distributions at each time offset from the trigger input. By sweeping all time offsets in the range of interest, a diagram appears on the sampling oscilloscope display, which reveals the quality of the measured high-speed bit stream. This type of diagram, oftentimes called an "eye" diagram, is often used to view high-speed binary pulse bit streams during the various development, installation and maintenance phases of high-speed communications systems.

A problem exists in using sampling oscilloscopes in this manner to measure the quality of high-speed communication systems. As the bit stream data rate increases, the bandwidth of the sampling oscilloscopes needed to create the eye diagrams increases proportionally thereto resulting in a higher cost. Another problem arises in that as the cost of the sampling oscilloscopes increases and due to the design issues of super high-speed systems, the present sampling methods takes samples at a relatively few of all the possible edges of the bit stream pulses thereby limiting the current effective sampling rate in the range of ten thousand samples per second by typical known systems. Accordingly, a need exists in the art for an apparatus and a method for actively determining the quality of high-speed binary pulse bit streams used to transfer information and data between communications systems.

SUMMARY OF THE INVENTION

It is an object of the invention to provide binary pulse coded waveform measuring apparatus for determining the characteristics of a high speed bit stream of binary pulses used to transfer information between communications systems and in particular to generate an eye diagram defining the quality of the binary pulse bit stream.

It is also an object of the invention to provide to provide logic apparatus for sampling pulse voltage levels in excess of a series of voltage threshold levels during each of a series of delayed clock pulses for a series of pulses of the binary pulse bit stream.

It is also an object of the invention to provide a control apparatus coupled to the logic apparatus and controlled by a programmed processor to generate the series of threshold voltage levels and the delayed clock pulses during each period of a bit stream pulse. The control apparatus accumulates multiple counts of the sampled pulse voltage levels during each delayed clock pulse for a series of pulses of the binary coded pulse bit stream and processes the accumulated counts to generate an eye diagram therefrom defining the characteristics of the binary pulse bit stream.

It is a further object of the invention to provide a method for determining characteristics of a bit stream of binary pulses by sampling pulse voltage levels in excess of voltage threshold levels during each of delayed clock pulses for a series of pulses of the binary coded pulse bit stream. The method generates a series of the voltage threshold levels and the delayed clock pulses during each period of a bit stream pulse and accumulating multiple counts of the sampled pulse voltage levels during each delayed clock pulse for a series of pulses of the binary pulse bit stream. The accumulated counts are processed to generate an eye diagram defining the characteristics of the binary pulse bit stream.

In a preferred embodiment of the invention, apparatus for determining characteristics of a bit stream of binary pulses has measuring apparatus for sampling pulse voltage levels in excess of voltage threshold levels during each of delayed clock pulses for a series of pulses of the binary coded pulse bit stream. Control means coupled to the measuring apparatus generates a series of the threshold voltage levels and the delayed clock pulses during each period of a bit stream pulse and accumulates multiple counts of the sampled pulse voltage levels during each delayed clock pulse for a series of pulses of the binary coded pulse bit stream. The accumulated counts are processed to generate an eye diagram therefrom defining the characteristics of the binary pulse bit stream.

Also in accordance with the preferred embodiment of the invention, a method for determining characteristics of a bit stream of binary pulses generates a series of threshold voltage levels and delayed clock pulses during each period of a bit stream pulse. The method measures and accumulates multiple counts of pulse voltage levels in excess of the generated voltage threshold levels during each delayed clock pulse for a series of pulses of the binary coded pulse bit stream. The method then analyzes the accumulated voltage counts and generates an eye diagram therefrom defining the characteristics of the binary pulse bit stream.

BRIEF DESCRIPTION OF THE DRAWINGS

For a further understanding of the objects and advantages of the present invention, reference should be had to the following detailed description, taken in conjunction with the accompanying drawing figures, in which like parts are given like reference numerals and wherein.

DETAILED DESCRIPTION

Figure 1:
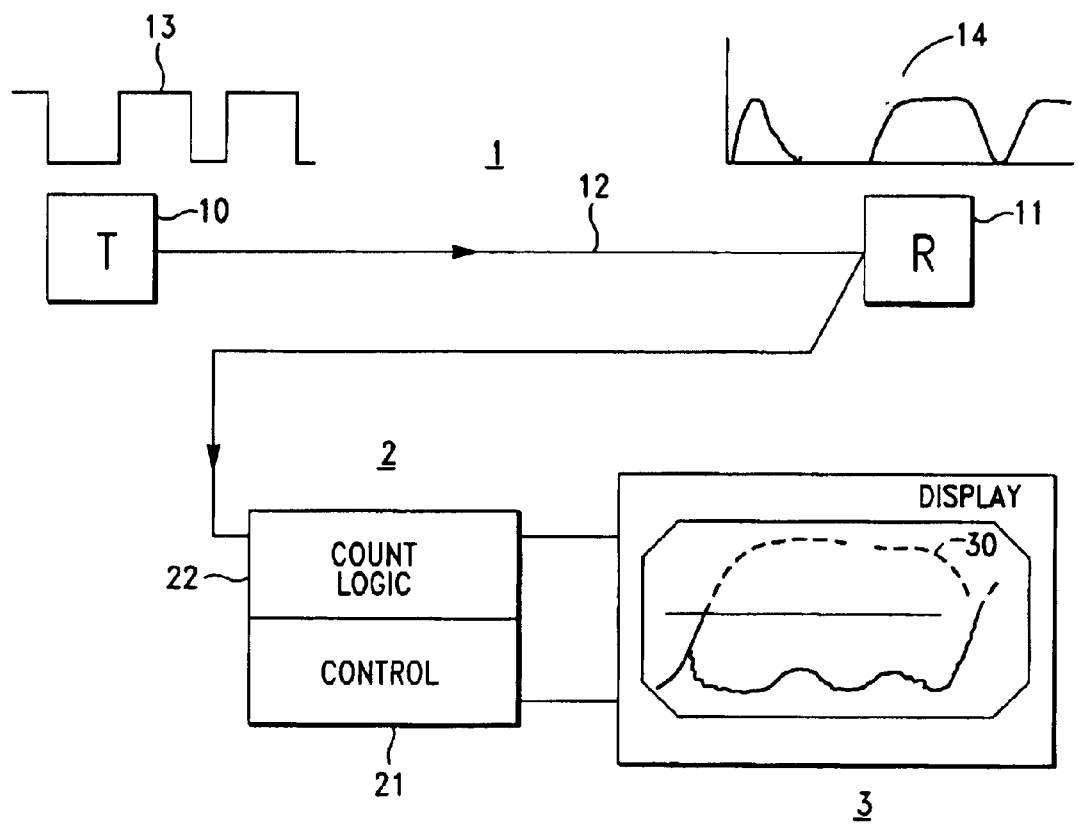
FIG. 1 is a block diagram of binary pulse coded waveform measuring apparatus in accordance with the principles of the invention connected to a communication system for generating a statistical eye diagram measurement of a binary pulse coded waveform transmitted from a system transmitter to a system receiver.

Referring to FIG. 1 of the drawing, high-speed communication system 1 consists of a transmitter 10 interconnected by a transmission facility 12 with a receiver 11. Information is transmitted to receiver 11 in a binary coded pulse format as a binary bit stream 13 applied to the input of transmission facility 12. Transmission facility 12 may be any one of a large number of high-speed transmission facilities such as coaxial cables, optical fibers, radio and satellite links or the like. In a typical application, the binary pulses of input binary bit stream 13 may be reconfigured by the characteristics of the transmission facility 12 and appear as the rounded binary coded pulse format shown as the binary bit stream 14 received by receiver 11. The binary pulse coded waveform measuring apparatus 2 as set forth in FIG. 1, may be connected to transmission facility 12 at either the output of transmitter 10, the input of receiver 11, at various locations along transmission facility 12 or at various locations within transmitter 10 and receiver 11 wherein it is desired to measure the quality of the transmitted and received binary pulse coded bit streams. In operation, control 21 controls the operation of count logic 20 to generate a statistical eye diagram 30 representing the quality of the measured the binary pulse coded bit stream 14 on display apparatus 3 which may be any one of a number of well known display such as a computer or stand alone monitors, plotters, various storage devices, or the like.

In order to create an eye diagram from the measured high speed pulse coded bit stream, samples must be collected from the waveform such that the samples correspond to the number of times that the waveform of the measured pulse crosses over a time offset and voltage coordinate for all the time offsets and voltage levels of interest. In general, a pulse coded bit stream consists of a series of succeeding "0" and "1" pulses wherein each "0" pulse is transmitted at one voltage level and each "1" pulse is transmitted at another voltage level. The specific sequence of the of the "0" and "1" pulses define the information or data transmitted by transmitter 10 to receiver 11. The pulses have a repetition rate wherein each pulse has a period of time, hereinafter referred to as the pulse period, and follows a preceding pulse at the repetition rate determined by the communication system clock.

Measuring apparatus, or count logic 20, controlled by control 21, samples the pulse voltage levels in excess of voltage threshold levels during each of delayed clock pulses for a series of pulses of the binary coded pulse bit stream. Count logic 20 collects counts of the voltage of each pulse during the pulse period at variable voltage thresholds $V_{VT}$ occurring at voltage steps $\Delta V$ between a minimum voltage $V_{MIN}$ and a maximum voltage $V_{MAX}$ at a variable time delayed clock pulse $T_{VD}$ occurring in time steps $\Delta T$ between a range of zero and a selected maximum time $T_{MAX}$.

Control 21 coupled to the count logic 20 generates a series of the threshold voltage levels $V_{VT}$ and the delayed clock pulses $T_{VD}$ during each period of a bit stream pulse and accumulates multiple counts of the sampled pulse voltage levels in excess of the threshold voltage levels $V_{VT}$ during each delayed clock pulse $T_{VD}$ for a series of pulses of the binary coded pulse bit stream. The counts are recorded by control 21 as an Eye Data Array A1 2111 in memory 211 (FIG. 2) wherein the count data is stored at positions $T_{VD}$, $V_{VT}$ in the array defined by the voltage threshold levels $V_{VT}$ separated by the voltage step $\Delta V$ and at ones of the delayed clock pulses $T_{VD}$ separated by the time step $\Delta T$ during pulse periods of the series of pulses succeeding the first measured binary pulse. Thus, the count starts in each pulse at time zero of the pulse period wherein counts of the pulse voltage level are taken and recorded in the Eye Data Array as the variable voltage threshold $V_{VT}$ is moved from the minimum voltage $V_{MIN}$ to the maximum voltage $V_{MAX}$. The time delay clock pulse $T_{VD}$ is advanced in time a time step $\Delta T$ and the counting process is repeated. The count measurement continues in $\Delta T$ steps until time $T_{MAX}$ is reached. The measurement of the counts may be continued over a large number of the bit stream pulses, for example, over several thousand serial pulses, with the total count being recorded in the eye data array.

Figure 2:
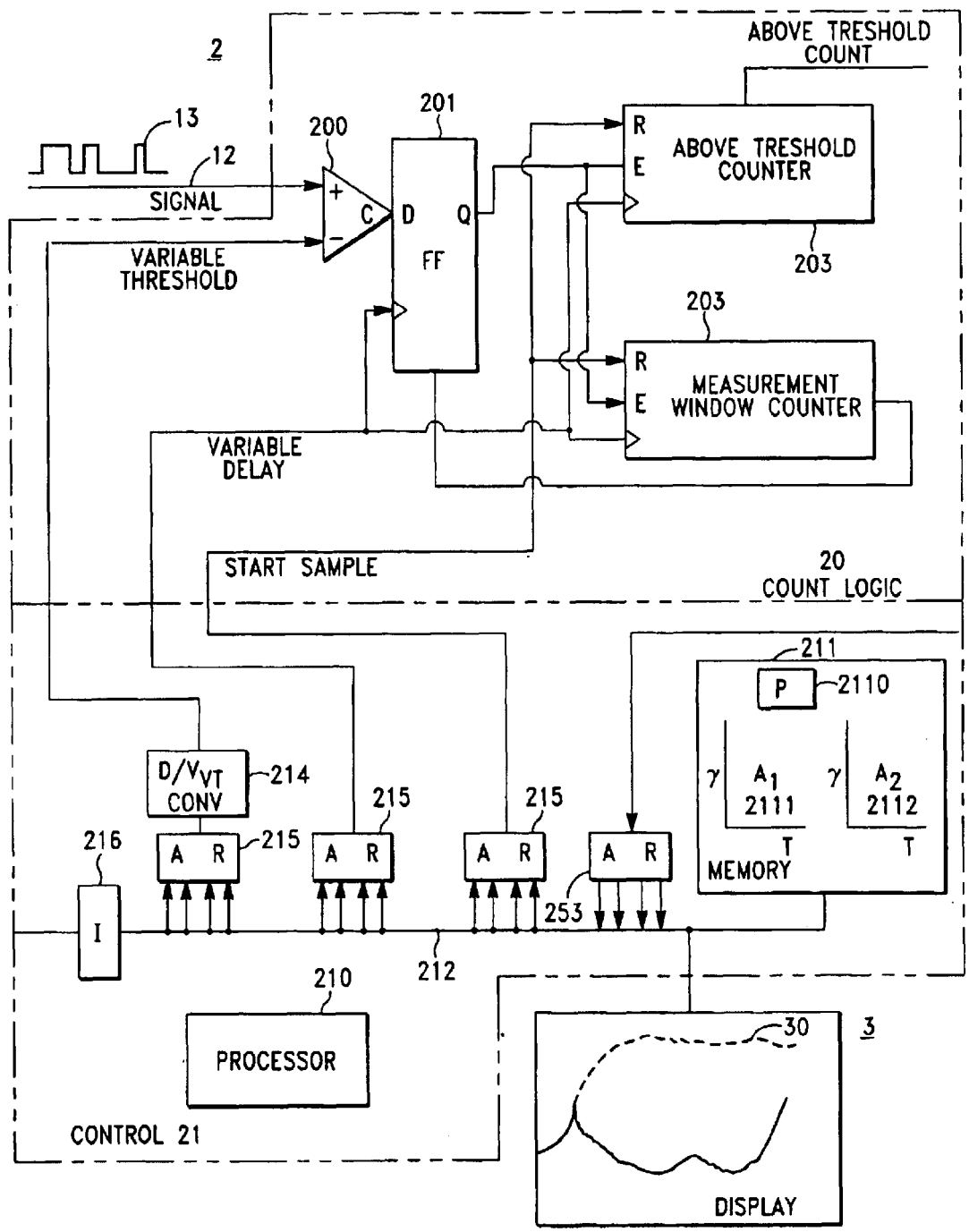
FIG. 2 is a block diagram of the binary pulse coded waveform measuring apparatus set forth in FIG. 1.

The binary pulse coded waveform measuring apparatus 2, FIG. 2, comprises count logic 20 controlled by a control 21. Control 21 may be any one of a number of different types of computers and need not be described in great detail. Sufficient for an understanding of the invention, control 21 has a processor 210 connected by a bus 212 to a memory 211 and a display unit 3. Processor 210 is also connected by bus 212 to address registers 213 and 215, the operation of the registers are well known. In the general operation, processor 210 addresses address register 213 and requests that the count data received from the above threshold counter 202 of count logic stored in address register 213 be recorded in the eye data array A1, 2111 of memory 211. Processor 210 also addresses address registers 215 and transfers information thereto that is stored in the address registers and used to control various components in the count logic 20. The high-speed binary bit stream 13 is applied to interface 216 so that processor 210 can generate clock pulses that are synchronous the repetition rate of the bit stream. The programs stored in memory 211 control processor 210 in the operation of the count logic 20 and control logic 21 in accordance with the principles of the invention.

Count logic 20 has a one-bit comparator 200 with one input connected to the transmission facility 12 or other point in the transmitter 10 or receiver 11 to measure the high speed binary coded bit stream 13. The logic elements 200 and 201 are the main sampling components and are comprised of a D-type flip-flop 201 preceded by a one-bit comparator 200. The one-bit comparator 200 will output a high when the signal voltage on the positive pin is higher than the signal voltage on the negative pin. The D-flip flop 201 will copy the value on the "D" input to the "Q" output connected to the enable input of the above threshold counter 202. In operation, processor 210 determining a pulse repetition rate of the high speed binary pulse bit stream by interface 216 and generates a series of time delay clock pulses $T_{VD}$ each separated by a predefined time step $\Delta T$ during a period of each binary pulse and applies the time delay clock pulses $T_{VD}$ to the above threshold counter 202 and measurement window counter 203 via address register 215. The above threshold counter 202 is a synchronous enableable and resetable counter and is of a type well known in the art. The counter will increment when not reset only when the enable line is "1" (high) at the rising edge of a clocking signal applied to the counter. Above threshold counter 202 holds the number of counts that succeeded in being higher than the voltage threshold $V_{VT}$ as the voltage threshold $V_{VT}$ is moved from the minimum voltage $V_{MIN}$ to the maximum voltage $V_{MAX}$. threshold at the time of the rising edge of the time delay clock pulse $T_{VD}$.

The measurement window counter 203 is also a synchronous enableable and resetable counter and sets the measurement window size which sets the number of bits that are looked at to compute the "Above Threshold" count for each time delay clock pulse $T_{VD}$ and voltage threshold $V_{VT}$ position in the eye diagram. The variable voltage threshold $V_{VT}$ is a static control voltage applied to the negative pin of comparator 200 and is set by processor 210 by addressing address register 215 to control the digital to $V_{VT}$ converter 214 to step this voltage in precise increments and apply the appropriate voltage step $\Delta V$ increment to the negative pin of comparator 200.

Control 21 initiates the start sample sequence by applying a start sample pulse to reset the above threshold counter 202 and measurement window counter 203 which starts accumulating data. Once the measurement window counter 203 reaches it's terminal count, its corresponding output signal will cause the flip-flop 201 to shift the delayed sample value to the output and the apparatus 2 will automatically hold the current "Above Threshold" count ready to be stored away. To start the next measurement, control 21 generates a new variable voltage threshold $V_{VT}$ and/or variable time delay clock pulse $T_{VD}$ and another start sample pulse.

Figure 3:
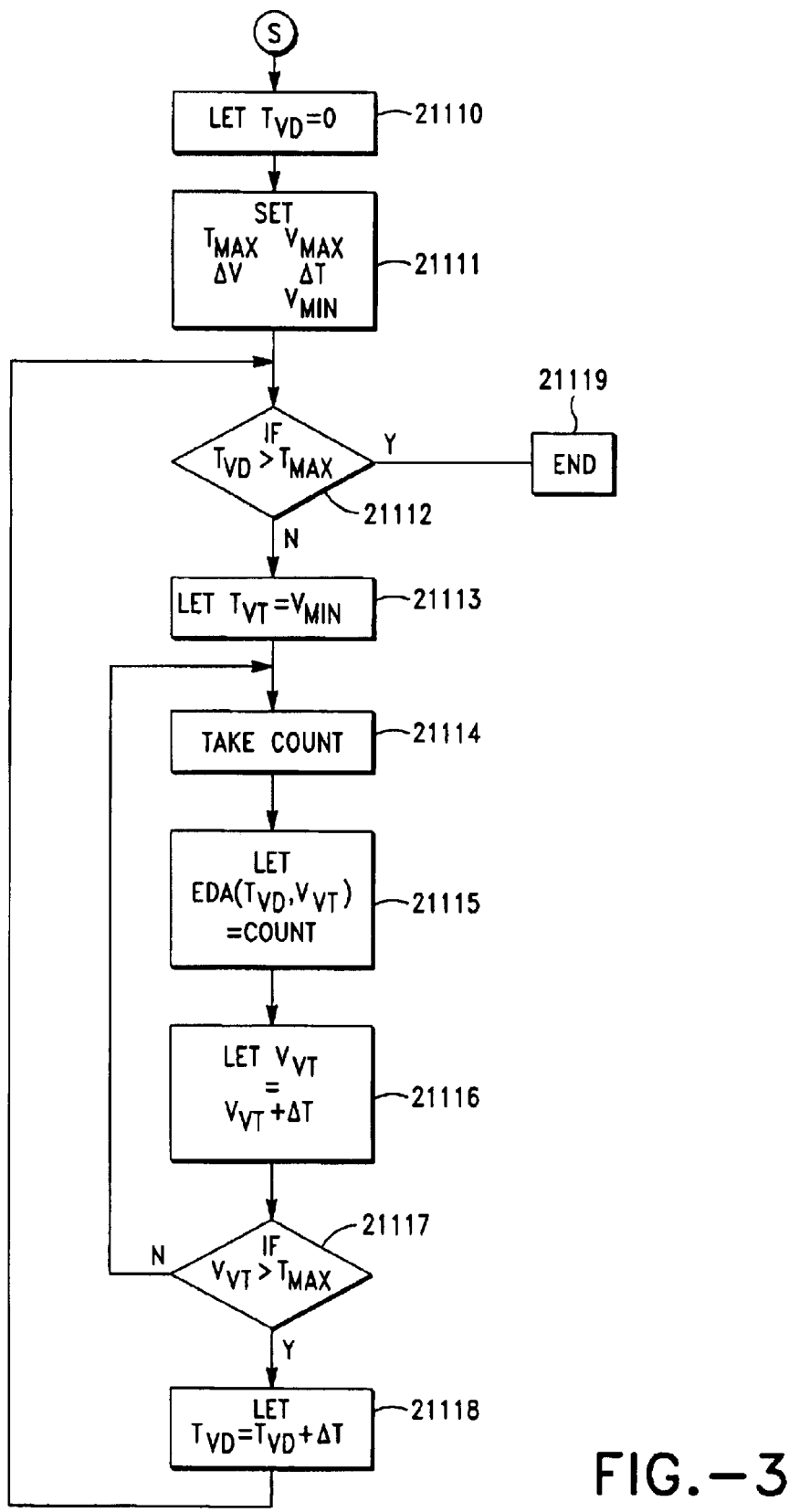
FIG. 3 is a flow chart of the operation of the measuring apparatus set forth in FIGS. 1 and 2 for generating an array of data counts of the measurement of the voltage levels versus time of each pulse of the high speed binary bit stream set transmitted between the transmitter and receiver of the communication system set forth in FIG. 1.
Figure 4:
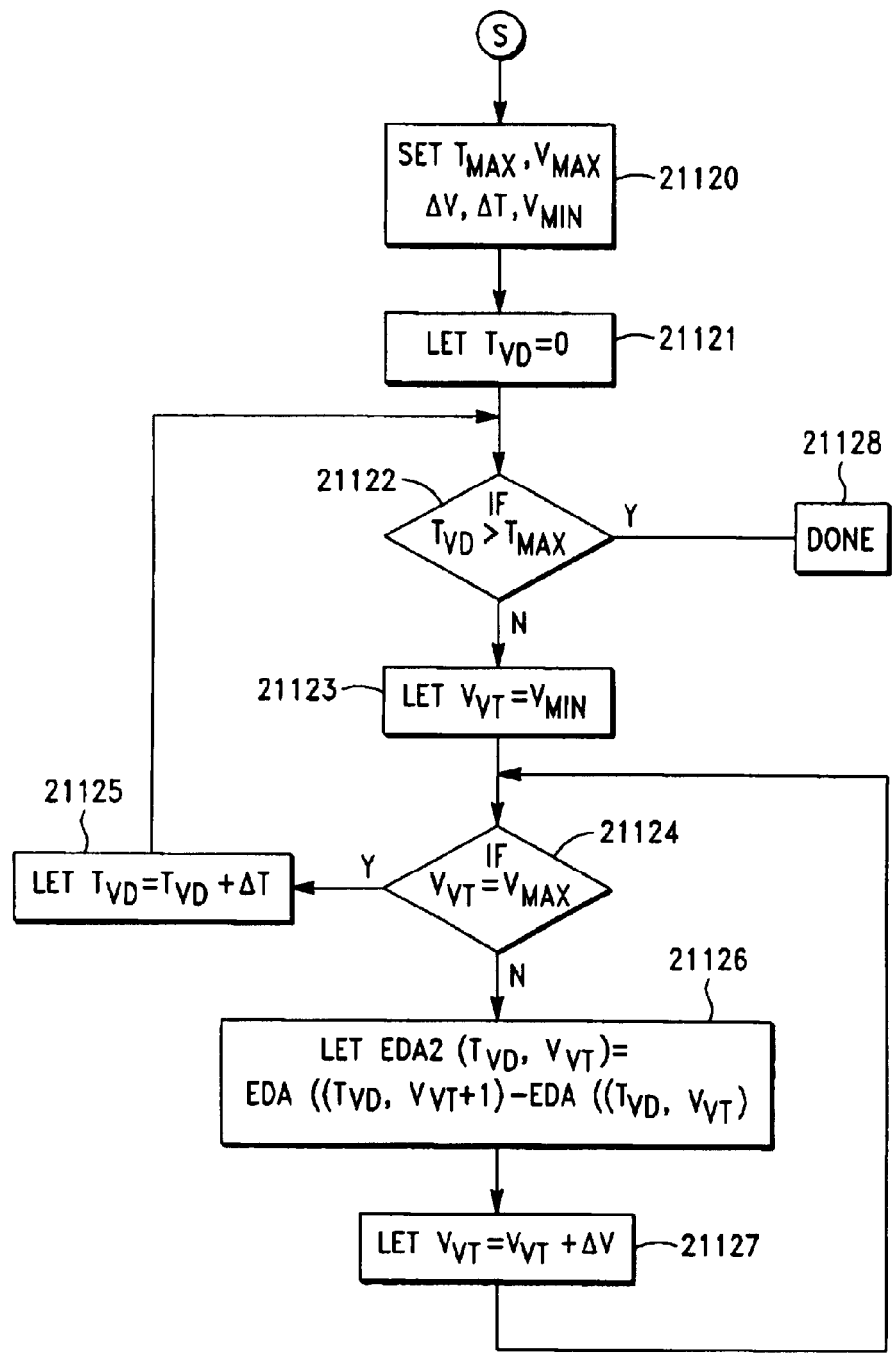
FIG. 4 is a flow chart of the operation of the measuring apparatus set forth in FIGS. 1 and 2 for processing the measurement data generated by executing the flow chart operating steps of FIG. 3 into a statistical array of eye diagram data.

The measurement algorithm, FIG. 3, is stored in memory 211 and starts controlling control 21 to apply the start sample pulse to control logic 20. The initial value of the variable time delay pulse $T_{VD}$ is set to zero, step 21110, and values selected by the user are assigned to time $T_{MAX}$, voltage $V_{MAX}$, time step $\Delta T$, voltage step $\Delta V$ and minimum voltage $V_{MIN}$, step 21111.

If the value of time delay pulse $T_{VD}$ is greater than the value of time $T_{MAX}$, step 21112, the algorithm is completed. If not, the variable voltage threshold $V_{VT}$ is set to the value of minimum voltage $V_{MIN}$, step 21113.

Count logic 20 takes the count, step 21114, and records the count in eye diagram array (EDA) AI 2111 at the position EDA (time delay pulse $T_{VD}$, variable voltage threshold $V_{VT}$), step 21115.

The variable voltage threshold $V_{VT}$ is increased by the value of the voltage step $\Delta V$. step 21116. If the new value of the variable voltage threshold $V_{VT}$, step 21117, is less than the value of voltage $V_{MAX}$, the algorithm repeats steps 21114 through 21116 to record counts in the eye data array 2111 at the appropriate time delay pulse $T_{VD}$ and variable voltage threshold $V_{VT}$ array positions.

When the value of the variable voltage threshold $V_{VT}$ becomes greater than the value of the voltage $V_{MAX}$, step 21117, the time delay pulse $T_{VD}$ is increased by the time step $\Delta T$, step 21118. Steps 21112 through 21117 are repeated to record additional counts in the eye data array 2111 at the appropriate time delay pulse $T_{VD}$ and variable voltage threshold $V_{VT}$ array positions. When the value of the time delay pulse $T_{VD}$ is greater than the value of time $T_{MAX}$, step 21112, the measurement algorithm is at an end, step 21119.

Figure 5:
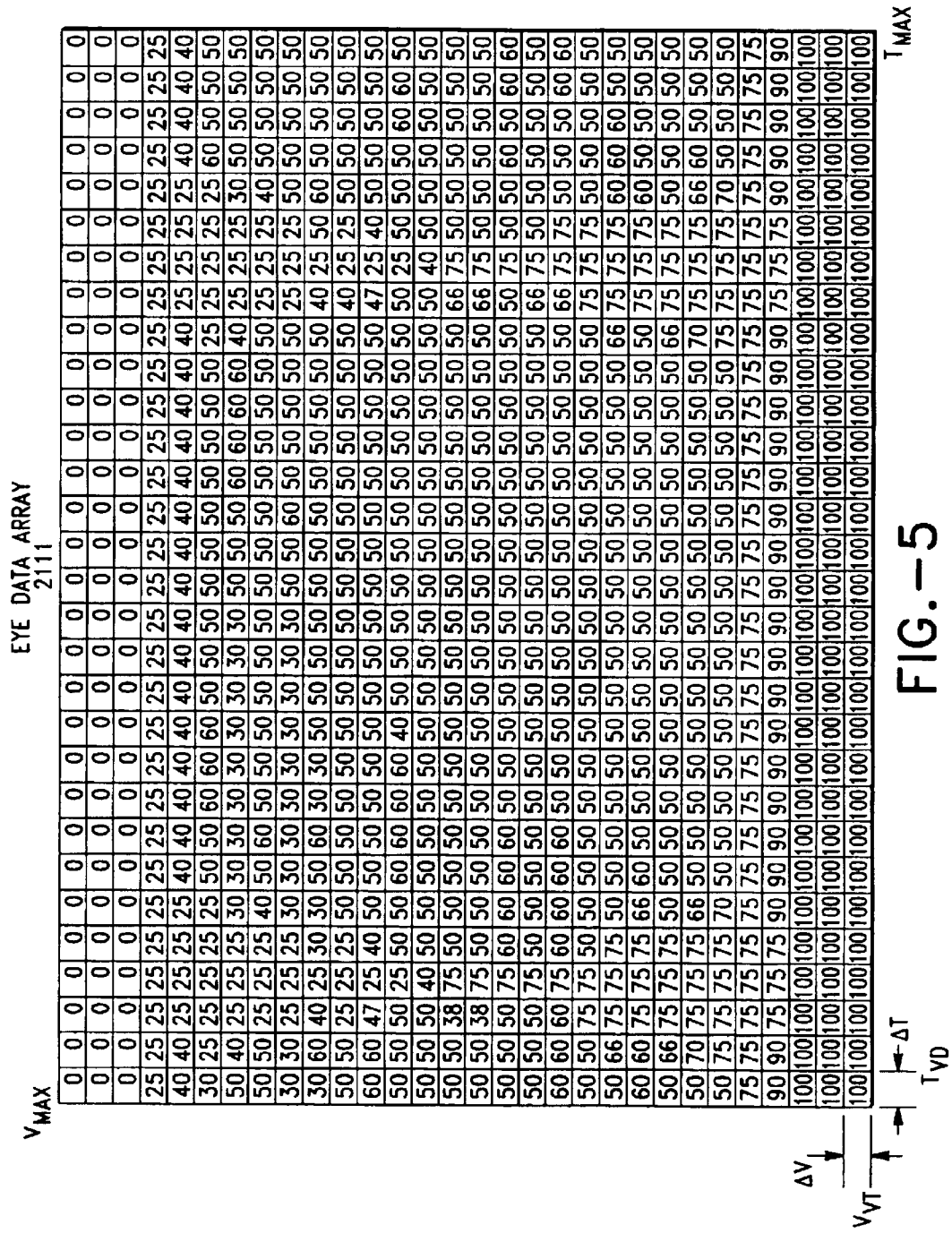
FIG. 5 is an example representation of the raw sample count data processed by operation of the measurement algorithm flow chart of flow chart of FIG. 3.
Figure 6:
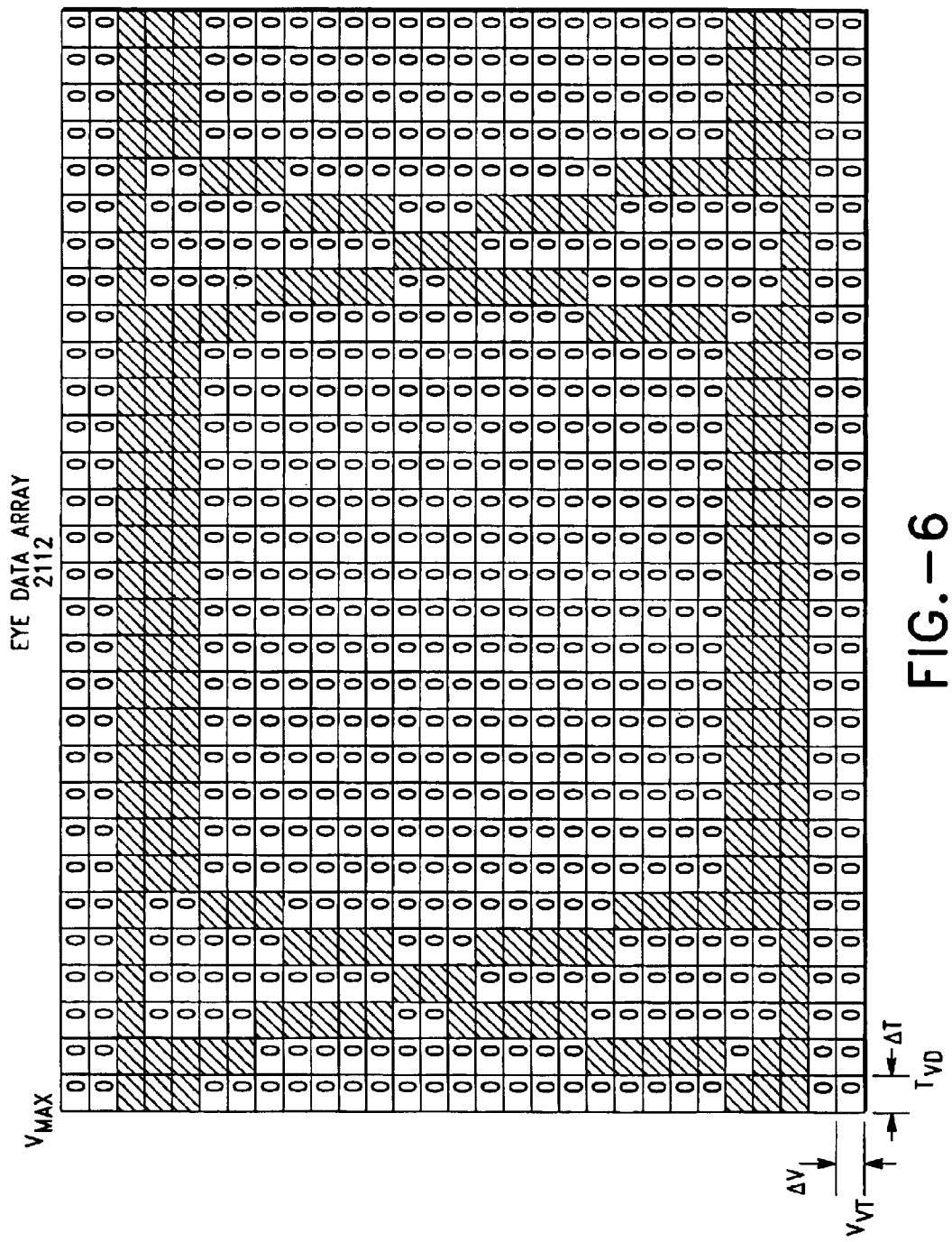
FIG. 6 is an example representation of the statistical data processed by the operation of the processing algorithm flow chart of flow chart of FIG. 5 to form an eye diagram representing the characteristics and quality of the high speed binary bit stream transmitted between the transmitter and receiver of the communication system set forth in FIG. 1.

Typically, the measurement may be repeated many times to determine the quality of a high speed binary pulse bit stream. Thus, when finished, the operation of the measurement algorithm has enabled processor 210, FIG. 2, to generate a first eye data array 2111 in memory 211 wherein the sampled pulse voltage level counts are recorded at array positions defined by ones of the variable voltage threshold levels $V_{VT}$ separated by the voltage step $\Delta V$ and at ones of the time delayed clock pulses $T_{VD}$ separated by the time step $\Delta T$ during the pulse periods. An example of an eye data array showing typical count data collected by the measuring algorithm of FIG. 3 is set forth in FIG. 5 of the drawing wherein the count data is recorded at the array positions $T_{VD}$, $V_{VT}$ wherein the time delay pulses $T_{VD}$ are separated by the time step $\Delta T$ and the variable voltage thresholds $V_{VT}$ are separated by the voltage step $\Delta V$.

It is obvious from the foregoing that the facility, economy and efficiency of binary pulse coded waveform measuring apparatus has been improved by apparatus arrange to measure a high speed binary pulse bit stream and generate an eye diagram showing the characteristics and quality of the measured high speed binary pulse bit stream.

While the foregoing detailed description has described an embodiment of specific binary pulse coded waveform measuring apparatus, it is to be understood that the above description is illustrative only and is not limiting of the disclosed invention. Particularly other configurations are within the scope and spirit of this invention. Thus, the invention is to be limited only by the claims set forth below.

What is claimed is:

1. Apparatus for determining characteristics of a bit stream of binary pulses comprising measuring means for sampling pulse voltage levels in excess of variable voltage threshold levels during each of delayed clock pulses for a series of pulses of the binary pulse bit stream, and control means coupled to the measuring means for generating a series of the variable voltage threshold levels and the delayed clock pulses during each period of a bit stream pulse and accumulating multiple counts of the sampled pulse voltage levels during each delayed clock pulse for a series of pulses of the binary coded pulse bit stream and analyzing and processing the accumulated counts to generate an eye diagram therefrom defining the characteristics of the binary pulse bit stream.

2. The binary pulse bit stream characteristics determining apparatus set forth in claim 1 wherein said control means comprises a processor for determining a pulse repetition rate of the binary pulse bit stream and generating a series of the delayed clock pulses each separated by a predefined time step during a period of each binary pulse.

3. The binary pulse bit stream characteristics determining apparatus set forth in claim 2 wherein the processor generates a series of voltage threshold levels each separated by a predefined voltage step during each of the delayed clock pulses.

4. The binary pulse bit stream characteristics determining apparatus set forth in claim 3 wherein the processor generates a first eye data array in a memory of the processor wherein the sampled pulse voltage level counts are recorded at array positions defined by one of the voltage threshold levels separated by the voltage step and at one of the delayed clock pulses separated by the time step during a first pulse period.

5. The binary pulse bit stream characteristics determining apparatus set forth in claim 4 wherein the processor accumulates sampled pulse voltage level counts in the first eye data array at positions defined by the voltage threshold levels separated by the predefined voltage step and at one of the delayed clock pulses separated by the time step during pulse periods of the series of pulses succeeding the first pulse.

6. The binary pulse bit stream characteristics determining apparatus set forth in claim 5 wherein the processor generates a second eye data array in the processor memory.

7. The binary pulse bit stream characteristics determining apparatus set forth in claim 6 wherein the processor subtracts the sampled pulse voltage level count recorded in each voltage threshold plus one position of a delayed clock pulse from the sampled pulse voltage level count recorded in the voltage threshold position of each delayed clock pulse and records the result as a count in a corresponding voltage threshold and delayed clock position of the second eye data array.

8. The binary pulse bit stream characteristics determining apparatus set forth in claim 7 wherein the processor displays the second eye data array as the eye diagram defining the characteristics of the binary pulse bit stream.

9. A binary pulse waveform measuring apparatus for determining characteristics of a bit stream of binary pulses comprising logic means for sampling pulse voltage levels in excess of variable voltage threshold levels during each of delayed clock pulses for a series of pulses of the binary coded pulse bit stream, and control means controlled by a program controlled processor and coupled to the logic means for generating a series of the variable voltage threshold levels and the delayed clock pulses during each period of a bit stream pulse and accumulating multiple counts of the sampled pulse voltage levels during each delayed clock pulse for a series of pulses of the binary coded pulse bit stream and processing the accumulated counts to generate an eye diagram therefrom defining the characterstics of the binary pulse bit stream.

10. The binary pulse waveform measuring apparatus set forth in claim 9 wherein the logic means comprise a voltage comparator having a one pin input for receiving the bit stream of binary pulses and another comparison input for receiving a series of the voltage threshold levels each separated by a predetermined voltage step and a logic device having one input connected to an output of the voltage comparator for generating counts when the pulse voltage level exceeds the voltage threshold levels at each delayed clock pulse.

11. A binary pulse waveform measuring apparatus for determining characteristics of a bit stream of binary pulses comprising logic means for sampling pulse voltage levels in excess of variable voltage threshold levels during each of delayed clock pulses for a series of pulses of the binary coded pulse bit stream, and control means controlled by a program controlled processor and coupled to the logic means for generating a series of the variable voltage threshold levels each separated by a predetermined voltage step and the delayed clock pulses each separated by a predetermined time step during each period of a bit stream pulse and accumulating multiple counts of the sampled pulse voltage levels during each delayed clock pulse for a series of pulses of the binary coded pulse bit stream and processing the accumulated counts to generate an eye diagram therefrom defining the characteristics of the binary pulse bit stream.

12. A method for determining characteristics of a bit stream of binary pulses comprising the steps of generating a series of variable voltage threshold levels and delayed clock pulses during each period of a bit stream pulse, measuring and accumulating multiple counts of pulse voltage levels in excess of the generated variable voltage threshold levels during each delayed clock pulse for a series of pulses of the binary coded pulse bit stream, and analyzing and processing the accumulated voltage counts and generating an eye diagram therefrom defining the characteristics of the binary pulse bit stream.

13. A method for determining characteristics of a bit stream of binary pulses comprising the steps of sampling pulse voltage levels in excess of variable voltage threshold levels during each of delayed clock pulses for a series of pulses of the binary pulse bit stream, generating a series of the variable voltage threshold levels and the delayed clock pulses during each period of a bit stream pulse and accumulating multiple counts of the sampled pulse voltage levels during each delayed clock pulse for a series of pulses of the binary pulse bit stream, and processing the accumulated counts to generate an eye diagram therefrom defining the characteristics of the binary pulse bit stream.

14. The method for determining characteristics of a binary pulse bit stream set forth in claim 13 wherein the generating step comprises the step of determining a pulse repetition rate of the binary pulse bit stream and generating a series of the delayed clock pulses each separated by a predefined time step during a period of each binary pulse.

15. The method for determining characteristics of a binary pulse bit stream set forth in claim 14 wherein the generating step further comprises the step of generating a series of voltage threshold levels each separated by a predefined voltage step during each of the delayed clock pulses.

16. The method for determining characteristics of a binary pulse bit stream set forth in claim 13 wherein the generating step also comprises the step of generating a first eye data array in a memory of a processor wherein the sampled pulse voltage level counts are recorded at array positions defined by one of the voltage threshold levels separated by the voltage step and at one of the delayed clock pulses separated by the time step during a first pulse period.

17. The method for determining characteristics of a binary pulse bit stream set forth in claim 16 wherein the processing step comprises the step of generating a second eye data array in the processor memory.

18. The method for determining characteristics of a binary pulse bit stream set forth in claim 17 wherein the processing step further comprises the step of subtracting the sampled pulse voltage level count recorded in each voltage threshold plus one position of a delayed clock pulse from the sampled pulse voltage level count recorded in the voltage threshold position of each delayed clock pulse and records the result as a count in a corresponding voltage threshold and delayed clock position of the second eye data array.

19. The method for determining characteristics of a binary pulse bit stream set forth in claim 17 wherein the processing step also comprises the step of displaying the second eye data array as the eye diagram.

20. A method for determining characteristics of a bit stream of binary pulses comprising the steps of:

sampling pulse voltage levels in excess of voltage threshold levels during each of delayed clock pulses for a series of pulses of the binary pulse bit stream;

generating a series of voltage threshold levels and the delayed clock pules during each period of a bit stream pulse and accumulating multiple counts of the sampled pulse voltage levels during each delayed clock pulse for a series of pulses of the binary pulse bit stream;

generating an eye data array by subtracting the sampled pulse voltage level count recorded in each voltage threshold plus one position of the delayed clock pulse from the sampled pulse voltage level count recorded in the voltage threshold position of each delayed clock pulse and recording the result as a count in a corresponding threshold and delayed clock position of the eye array; and generating an eye diagram from the eye data array, the eye diagram defining the characteristics of the binary pulse bit stream.

21. The method of claim 20, wherein each threshold voltage level is separated by a predefined voltage step during each of the delayed clock pulses.

22. The method of claim 20, wherein the threshold voltage level generation step further comprises the step of generating a first eye data array in a memory of a processor wherein the sampled pulse voltage level counts are recorded at array positions defined by one of the voltage threshold levels separated by a voltage step and at one of the delayed clock pulses separated by a time step during a first pulse period.

23. The method of claim 20, further including the step of displaying the eye diagram.

* * * * *